UNITED STATES PATENT OFFICE.

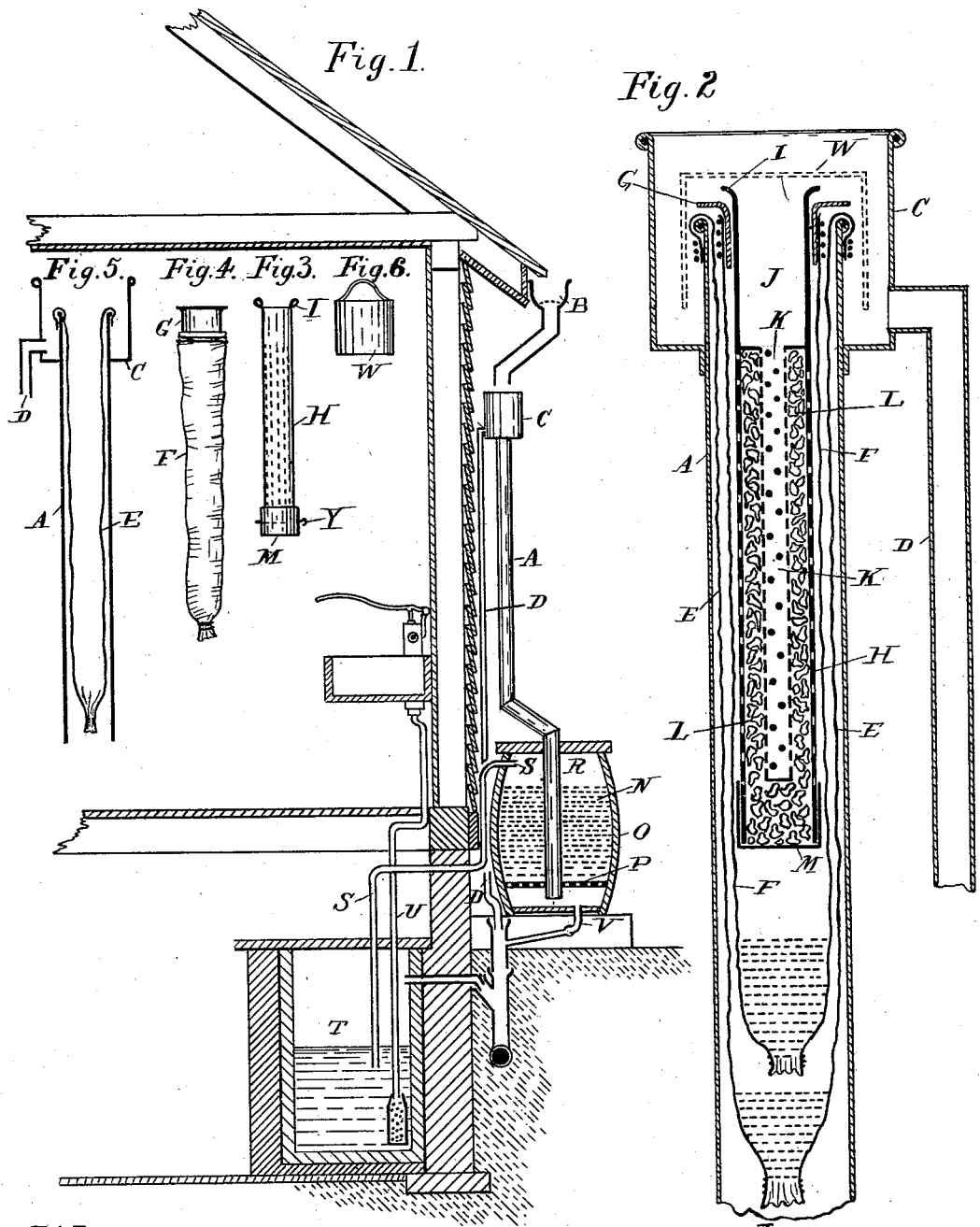

JACOB DORNBIRER, OF SANDUSKY, OHIO.

FILTER FOR RAIN-WATER.

SPECIFICATION forming part of Letters Patent No. 407,854, dated July 30, 1889.

Application filed March 9, 1889. Serial No. 302,614. (No model.)

*To all whom it may concern:*

Be it known that I, JACOB DORNBIRER, a citizen of the United States, residing at Sandusky, in the county of Erie and State of Ohio, have invented certain new and useful Improvements in Filters for Rain-Water, of which the following is a specification, reference being had therein to the accompanying drawings.

This invention relates to new and useful improvements in water-filters; and the invention consists in the peculiar construction, arrangement, and combination of the parts, all as more fully hereinafter described, and shown in the accompanying drawings, in which—

Figure 1 is an elevation, partly in section, showing my filter as applied for filtering rain-water and collecting it for domestic use. Fig. 2 is an enlarged vertical central section through the upper portion of the stand-pipe of the filter. Fig. 3 is a detached elevation of the strainer in the upper portion of the stand-pipe. Fig. 4 is a detached elevation of the filtering-bag used in the stand-pipe. Fig. 5 is a vertical central section through the upper end of the stand-pipe, with one filtering-bag in place; and Fig. 6 is a detached elevation of the cut-off or cup.

A is a stand-pipe, which, if the device is applied for filtering rain-water, as in Fig. 1, may represent a portion of the downfall-conductor, to which the water is conducted by a gutter on the roof. The upper end of this stand-pipe A is surrounded with a downfall-basin C, the upper edge of which projects above the top of the stand-pipe, and this basin communicates with an overflow-pipe D, which at the bottom preferably discharges into a sewer-connection or with a surface-gutter.

E is a filtering-bag detachably suspended within the stand-pipe A from the top edge thereof, and extends some distance down into the stand-pipe, F is another filtering-bag similarly suspended from the top of the stand-pipe within the filtering-bag E. To suspend the bag, I preferably tie into the mouth of it a flanged collar G, which rests upon the top edge of the stand-pipe, and the filtering-bag E may be suspended in a similar manner.

H is a tubular metallic strainer removably suspended within the inner bag in any suitable manner, preferably by providing it with ears I on the upper edge for lifting it out. The upper end of this strainer is imperforate and forms a receiving cup or basin J, communicating with a dependent strainer-tube K, which forms an annular space L between it and the outer strainer-tube H, and which space is filled with charcoal. The lower end of this strainer-tube H is provided with a detachable cap M, by means of which the charcoal can be readily filled into the annular space. The perforated portions of the strainer-tubes H and K may be formed of metal screen or perforated sheet metal, in which case the perforations are preferably made to leave the burr upon the inside.

The lower end of the stand-pipe A passes through the filtering-bed N, of sand, gravel, or other equivalent material, which is contained in a suitable filtering tank or barrel O, provided with a false bottom P, which is perforated and upon which the filtering material is supported, preferably with coarser material—such as gravel—at the bottom, and fine clean river sand on top. Above the filtering material a space R is left on top of the vessel and into which communicates an overflow-pipe S, which conducts the water to the storage reservoir or cistern T, from which, in the domestic application of the device, the water may be drawn through a suitable suction-pipe U into the house.

If exposed to the possibility of freezing, the filtering-tank is provided near its bottom with an outlet V, controlled by a suitable faucet, by means of which the water in the filtering-tank may be drawn off.

Where a waste-drain is available, I make suitable connection between said drain and the different overflows or wastes described or necessary.

In practice it will be seen that by a device constructed substantially as shown and described, if the water to be filtered is poured into the receiving-basin J of the strainer it will first pass through the perforations of the dependent strainer-tube K, in which all coarse impurities are retained. From there it passes through the filtering material or charcoal L, then from the perforations of the outer strainer-tube K into the bag F, which is preferably made of canvas, duck, burlap, or other like material suitable for filtering. After passing through the bag F the water passes through the outer bag E into the stand-pipe A, which discharges it into the bottom of the filtering-tank O, from which it is filtered in an upward direction through the bed N of the filtering material into the space above, from which it finds its way finally through the oveflow-pipe S into the reservoir or cistern. Provided the stand-pipe A rises a suitable distance above the filtering-tank O, it is evident that no matter what depth of filtering-bed there may be contained in the filtering-tank the hydraulic pressure will force the water through it. As the water is delivered into the filtering-tank already in a state of comparative freedom from organic matter, which naturally will have been retained in the upper filters contained in the top of the stand-pipe, it is obvious that after a final purification of the water through the filtering-bed N the water will be rendered perfectly pure, no matter in what condition it was when first entering the upper filter.

One of the main advantages of my filter is its peculiar adaptation for domestic use, either for filtering rain-water while it flows off the roof of the house, or for filtering any other kind of water available from rivers or lakes, or other bodies of water in the vicinity, in which latter case I preferably pump the water from such source into an elevated water-tank, and carry it from there through a suitable pipe into the upper end of the stand-pipe A, in a similar manner as the rain-water is discharged, taking care not to deliver the water any faster than the filter will take care of.

As in filtering rain-water it is impossible to foresee the amount of rain-water falling off the roof, I provide the outer overflow-basin C, into which the water is received if the cup J overflows, and from there it is carried through the overflow-pipe D, which is made suitably large to provide for the contingency of a heavy rain.

If no water is required to be filtered, I place an inverted cup W, as shown in Fig. 6 and indicated in dotted lines in Fig. 2, over the top of the stand-pipe A, whereby all the water is diverted to the overflow.

A further advantage of my construction consists in the ready manner in which the filters may be inspected and cleaned, as each filtering medium is freely suspended without fastening, and may therefore be lifted out and cleaned; or, in the case of the strainer-tube H, may receive further filtering material if the old one has become slimy or unfit for use.

The cap M on the lower end of the strainer-tube is preferably merely held in place by the detachable cross-pin Y, so that it may be readily taken off and the interior of the strainer-tube washed out, and then be readily refilled into the strainer-tube H from the bottom.

The bags are preferably only tied together at the lower end, so that they may be readily turned inside out for cleaning, and to hold them in a more stretched condition I preferably fill their lower ends with some gravel or sand.

The filtering-tank I preferably provide with a removable cover, which can be readily taken off and the gravel or sand taken out if it needs renewal after having been used.

If any danger exists of leaves or any other coarse débris being carried into the cup J, I preferably provide a coarse screen, either in the trough B or anywhere between it and the cup J.

My device is not only relatively inexpensive, and of such a nature as to be readily constructed by any ordinarily-skilled person, but it has the further advantage of being capable of filtering a large amount of water, provided a suitably large strainer is used, and with ordinary vigilance in inspecting and keeping the filters clean the purest possible water is obtained, no matter how contaminated it might have been.

Experience in the use of filters has taught that one of the most essential features is the facility with which it may be inspected and cleaned from time to time. This requirement I think has been solved most satisfactorily in my construction, in view of the multiplicity and extent in numbers of the filters which I employ and consider necessary to obtain the utmost guarantee of obtaining pure water.

What I claim as my invention is—

1. In a water-filter, the combination of a stand-pipe containing filtering devices supplied from a receiving-basin in the upper end of said stand-pipe, an overflow-basin around the top portion of said stand-pipe and extending above the same, a dependent strainer-tube from the bottom of said basin, and a waste-pipe from said overflow-basin, substantially as described.

2. In a water-filter, the combination of a stand-pipe, one or more filtering-bags suspended therein, and strainer-tube similarly suspended within said bag or bags and provided with a receiving-basin in its top, and a dependent strainer-tube from the bottom of said basin, substantially as described.

3. In a water-filter, the combination of a stand-pipe, one or more filtering-bags suspended therein, a strainer-tube suspended within said bag or bags, a receiving-basin in the upper end of said strainer-tube and provided with a dependent strainer at its bottom an overflow-basin around the top of the stand-pipe, and a waste-pipe therefrom, substantially as described.

4. In a water-filter, the combination of a stand-pipe, one or more filtering-bags detachably suspended therein, a strainer-tube detachably suspended within said bag or bags and provided with a detachable cap at its lower end, a receiving-basin in the upper end of said strainer-tube, a strainer-tube depending from the receiving-basin within the aforesaid straining-tube, and a filtering material in the space between the two strainer-tubes, substantially as described.

5. In a water-filter, the combination of the stand-pipe A, the overflow-basin C around the top, the waste-pipe D therefrom, the suspended filtering-bags E and F in the stand-pipe, the strainer-tube H, suspended within said bags, the receiving-basin J, formed in the upper end thereof, the strainer-tube K, dependent from the bottom of said basin, the filtering material L between the strainer-tubes, and the detachable cap M on the strainer-tube H, substantially as described.

6. In a water-filter, the combination of the filtering-tank O, containing the bed of filtering material N, the stand-pipe A, extending from near the bottom of said tank to a distance above the height of the same, the filtering devices suspended from the top within said stand-pipe and provided with the receiving-basin J, the overflow-basin C around the top of said stand-pipe and provided with the waste-pipe D, and the overflow-pipe S from the filtering-tank into a storage-reservoir, substantially as described.

In testimony whereof I affix my signature, in presence of two witnesses, this 4th day of February, 1889.

JACOB DORNBIRER.

Witnesses:
J. PAUL MAYER,
A. B. EATON.